May 16, 1961

A. L. AYMAMI ET AL 2,984,262

CONTINUOUS WRAPPED HOSE AND METHOD OF MAKING THE SAME

Filed Nov. 21, 1958

INVENTORS
Arthur L. Aymami, Donn K. Lillich
Joseph R. Gibbons, Orland A. Moore

BY John E. Reilly

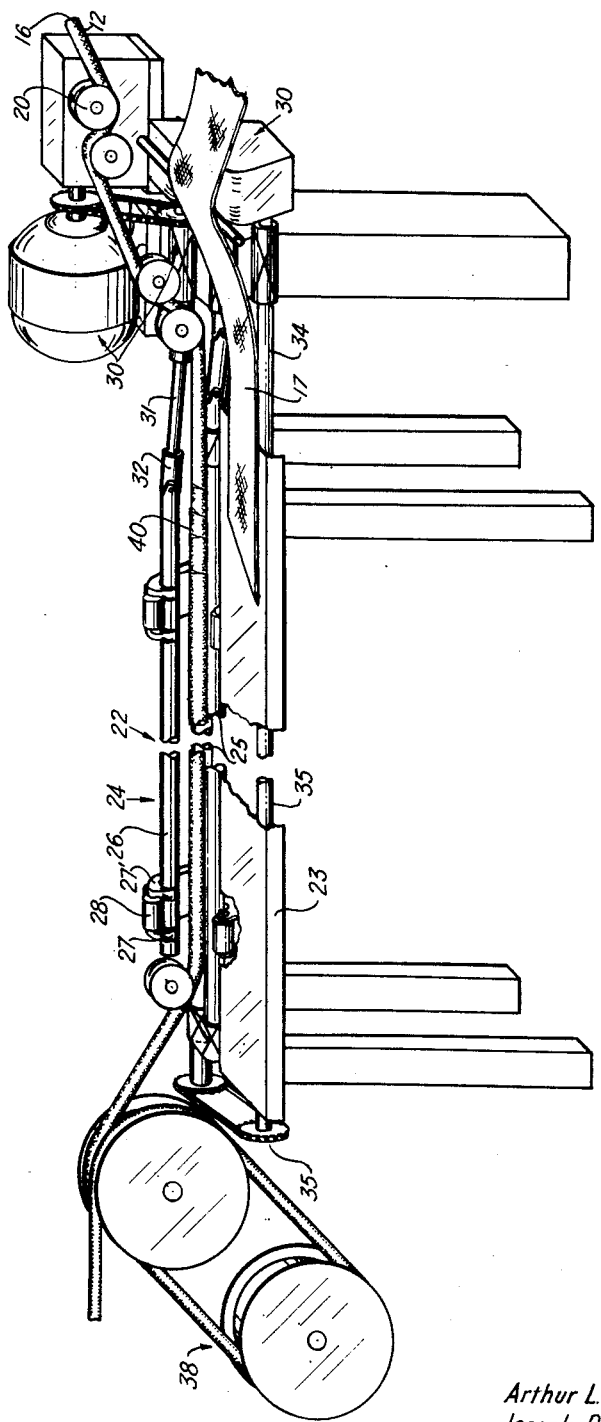

United States Patent Office 2,984,262
Patented May 16, 1961

2,984,262

CONTINUOUS WRAPPED HOSE AND METHOD OF MAKING THE SAME

Arthur L. Aymami, Donn K. Lillich, Joseph R. Gibbons, and Orland A. Moore, all of Denver, Colo., assignors to The Gates Rubber Company, Denver, Colo., a corporation of Colorado Filed Nov. 21, 1958, Ser. No. 775,447

6 Claims. (Cl. 138—126)

This invention is related to hose and to a method of making the same, and more particularly, has relation to the manufacture of wrapped hose, wherein the reinforcing layer, or carcass, is applied in the formation of the hose by a normal wrapping, as distinguished from a spiral wrapping, operation.

In the formation of reinforced hose incorporating therein a layer of reinforced fabric, it has been customary in the past to form the rubber-like core, or tube, by means of extruding the rubber-like material through a tubing machine and onto a flexible mandrel, then to sever or cut the tube at predetermined lengths for applying individual lengths of a fabric reinforcing layer, since the tube and mandrel must be rotated a number of times in wrapping the fabric thereon. In this connection, the tube may be rotated either about a stationary axis or a moving axis depending upon the desired method of applying the fabric. After insulating a cover over the fabric layer in a well-known manner, such as again by extrusion, the assembled hose may then be vulcanized, either by the well-known rag-wrap process, or by encasing the hose in a lead sheath and running it through a lead press. The mandrel may then be blown out of the hose to form the finished article. In the latter respect, the lead press method of vulcanizing is generally deemed preferable, and accordingly it is desirable that the hose be run through the lead press continuously, rather than in separate lengths. For this reason, it is desirable to splice the sections together to again form an extended length of hose which is, however, time-consuming and also wasteful, since much of the end material at the spliced ends is eventually removed and turned into scrap in the finishing operation.

It would of course be desirable, in order to expedite the entire hose-forming operation, to obviate the necessity of first cutting the extruded tube and mandrel into separate lengths for the fabric-wrapping operation, followed by splicing the lengths together for the lead press curing phase. At the same time, since the mandrel is necessary to properly support the tube both during the fabric-wrapping operation and especially as it is run through the lead press, no method has been devised in the past, to the best of our knowledge, which would permit the use of a flexible mandrel for supporting the tube, yet enable the tube and supported mandrel to be twisted the necessary number of times to apply the fabric thereto. It is true that in the past this splicing operation has been avoided by twisting the fabric wrapping about a stationary tube, as described in Patent No. 2,010,061; however, in this patent the mandrel was eliminated and curing accomplished by rag-wrapping, as distinguished from the lead press operation.

In accordance with the present invention, it is proposed to eliminate the necessity of severing the extruded tube into individual lengths for the fabric-wrapping operation; and instead, to devise a way in which the mandrel may be utilized to properly support the tube but may be twisted during the fabric-wrapping operation without necessity of dividing the tube into individual lengths.

In this way, it is possible to reinforce the tube with the necessary plies of fabric, and in a conventional normal wrapping operation, followed by continuously extruding a cover onto the reinforced tube, then continuously running the assembled hose through the lead press for vulcanization. As a result, considerable savings are realized both in the amount of scrap produced during the hose forming operation and the amount of time necessary to produce the hose. Also, the quality of the hose is greatly improved especially for distribution in extended lengths since the fabric layers may be properly spliced to provide a wrapping of uniform thickness and strength.

It is therefore a primary object of the present invention to provide for an improved hose article and for a method of producing the same.

It is another object to provide for a method for producing hose in greatly extended lengths and in such a way that the successive lengths of tubing forming the hose may be normally wrapped with elongate sheets of calendered fabric without the necessity of severing each length of tubing for the wrapping operation.

It is a further object to provide a method and means for producing a continuous length of hose, incorporating therein a plurality of elongated sheets of rubberized fabric forming a reinforcing layer of uniform thickness throughout the length of the hose.

It is still a further object to provide a method of wrapping a plurality of elongated sheets of reinforcing fabric edgewise onto an advancing tube without severing each corresponding segment of the tube as it is being wrapped, and so splicing the reinforcing sheets together as to form a continuous layer of a uniform number of plies and thickness throughout the length of the hose.

Other objects and advantages of the present invention will become more apparent from a consideration of the following description, taken together with the accompanying drawings, in which:

Figure 2 is a side elevational view of a machine assembly which may be utilized in carrying out a typical normal wrapping operation.

Figure 5:
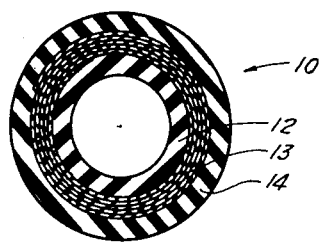
Figure 5 is a cross-sectional view of the hose upon curing and removal of the mandrel.

With more particular reference to the drawings, there is shown by way of illustration and not limitation in Figure 5 a reinforced hose member 10 which is comprised of an inner tube or core 12, preferably of some elastomeric material, having applied throughout the length thereof a fabric reinforcing layer 13 which comprises a number of plies of fabric wrapped normally about the tube 12 so that the longitudinal edges of the fabric are disposed parallel to the longitudinal axis of the tube, together with an outer rubber-like cover 14 which is extruded, or otherwise formed in the conventional manner over the fabric reinforcing layer 13. Reinforced rubber hose of this type is characterized by its high burst strength, which makes it especially adaptable for use under high pressure applications, such as for air hose, and in this connection it is highly desirable, especially where long lengths of the hose are required, that the hose be of uniform strength and thickness throughout. Moreover, although the hose finds considerable use in applications where relatively short lengths are desirable, it is nevertheless desirable to be able to ship the hose to the user in continuous lengths, and thereafter the user may divide the hose into any desired lengths. Moreover, notwithstanding the length of the hose, it will be of uniform strength throughout, so as not to necessitate the removal of any weak sections from the hose before using.

In the formation of the hose, a length of rubber tubing, preferably not cured, and of the desired internal diameter, may be formed in accordance with conventional practice by extrusion through a tubing machine, preferably of the cross-head type, not shown, onto a mandrel 16 and for purposes of illustration may be extruded in 1,000 foot lengths. Alternatively, the tube may be extruded separately, and then blown, or otherwise positioned upon a specially formed, flexible mandrel, which is of a length equal to the length of the tube itself, and of a diameter to provide for a close fitting relation between the tube and mandrel. The mandrel itself is preferably formed of a plastic or rubber-like material which will insure the necessary support for the tubing, yet is sufficiently elastic or resilient to permit several twisting revolutions throughout an extended length without the danger of cracking or separation.

Figure 1:
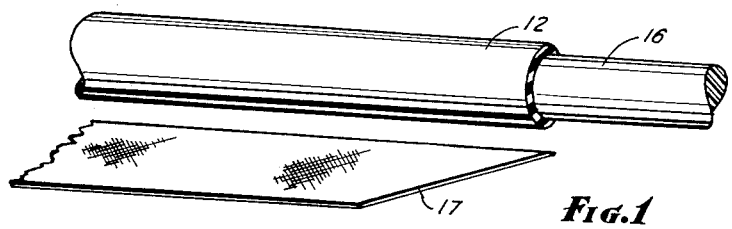
Figure 1 is a fragmentary perspective view illustrating the formation of a typical tube following extrusion onto a mandrel, and a fabric strip for application onto the tube.

As further shown in Figure 1, a fabric strip 17, employed in making the fabric-reinforcing layer 13 shown in Figure 5, may be suitably formed from any of the conventionally known types of fabric material, the fabric being employed in the production of this type of hose generally being of a square woven, slit or bias-cut form, which has previously been impregnated with rubber, reclaim, or some type of synthetic compound. The fabric reinforcing layer 13 is formed for application to the tubing 12 by dividing the fabric into the strips 17 of the desired width, the width of the strip being dimensioned so as to encircle the tubing the desired number of times to form the desired number of plies and as shown in Figure 1 the fabric strip 17 may, for example, be five times the circumferential distance around the hose so as to form five plies of reinforcing material about the tubing member.

As the extended length of tubing together with the mandrel is lead from the tubing machine, it may be conveniently placed upon a suitable hose pan or reel and disposed in the desired position at the leading end of a conventional building machine, as illustrated in Figure 2. The building machine itself may include at the leading end a suitable cement tank or similar means for application of cement around the tubing, together with a reel, not shown, and guide rollers 20 to guide the tubing from the hose pans onto a working platform or surface 22 for the tubing and fabric. The work platform 22 includes a table 23 and a series of rollers 24, preferably three, there being two bottom rollers 25 and a top roller 26 extending the length of the building machine. The lower or bottom rollers 25 may be of any desired length in accordance with the length of tubing to be wrapped at one time and, for instance, may be 50 feet in length and aligned in parallel closely spaced relation so as to form a horizontal working surface to accommodate the tubing between the rolls along the adjacent upper curved portions thereof. The roller 26 is positioned above the two bottom receiving rolls 25 and is preferably in the form of a pivotal pressure roll which is suitably supported through clamps 27 connected to a pivot arm 27' to be pivotal in downward movement into engagement with the top surface of the tubing as it rests on the two lower rolls 25. In order to apply the desired amount of pressure against the top surface of the tube 12, the pivotal arms 27 for the upper roll 26 have disposed at the outer ends thereof auxiliary rolls 28 which are made adjustable to bear against the pressure roll 26 by means of air pressure through suitable lines leading into the auxiliary rolls to move the upper roller either toward, or away from, the pivotal arm so that although the movement of the pivotal arm 27 will be consistent, the roll itself may be varied in downward movement with respect to the tubing itself. To rotate the rolls in the desired direction, the upper pressure roll 26 is suitably driven by means of a transmission system indicated generally at 30 having a drive shaft 31 connected into the upper roll 26 by means of a suitable knuckle joint 32 or the like to permit swiveled movement of the pressure roll 26 in relation to the drive shaft.

The bottom rolls are driven in the opposite direction and as shown such may be suitably carried out by connection of drive shaft 34 into the system 30 to drive sprocket chain 35 and the connected rolls 25 at the opposite end of the table. At the opposite end of the builder, pull or take-up rolls 28 are provided to lead the tubing, after the wrapping operation, from the building machine onto suitable reels, or the like, in preparation for the next operation in the formation of the hose.

Figure 3:
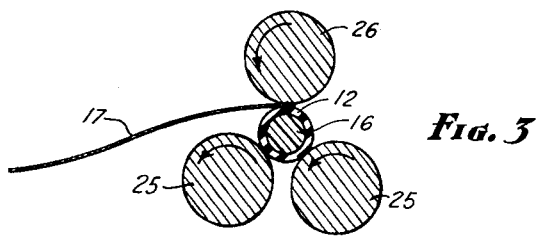
Figure 3 is a somewhat schematic view of a roller assembly for carrying out the wrapping operation in the hose forming process.

The wrapping operation itself is carried out by aligning the guide rollers 20 to lead the tubing 12 directly over the lower pressure rolls 25, so that the leading end of the tube is set directly along the bottom rolls 24 without sidewise bending the hose. As mentioned, for carrying out the wrapping operation, each of the three rolls may be 50 feet in length for example in order to wrap 50 feet of tubing at a time. Accordingly, 50 feet of the tubing is led along the bottom driven roll 24 until the leading end of the tube reaches the opposite ends of the rolls. A fabric strip 17 of the desired width is then extended the length of the work table 22, and once disposed in position opposite to the 50 foot length of hose, is also severed, or otherwise cut, into a corresponding 50 foot length. In this connection, the fabric strip 17 is preferably cut at an angle to the longitudinal axis of the tubing and the fabric strip, this angle being preferably 45°, so that in wrapping the ends will be wrapped in spiral form onto the tube 12. The fabric strip is brought into contact with the tubing by applying the longitudinal edge of the strip to the top surface of the tube, in a position such that the longitudinal edge is parallel to the longitudinal axis of the tube as shown in Figure 3. Of course, it is not essential that the longitudinal edge be aligned exactly with the longitudinal axis of the tube, and this angle between the two may be suitably varied, although by placing them substantially parallel, the strip may be applied to the tube without the necessity of undue twisting of the mandrel. Moreover, it is not essential that the strip be applied exactly along the longitudinal edge, so long as the upper roll 26 will come into close and uniform contact with the fabric strip itself for the wrapping operation. With the strip positioned upon the tube, the roller 26 is then lowered onto the fabric strip and the tube and is rotated in a counterclockwise direction with the rolls 25 driven in a counterclockwise direction until the strip is wrapped completely around the tube. The rollers 25 and 26 may then be reversed in direction so as to untwist the tube and mandrel and return them to their original strain-free position. As mentioned, the number of plies laid upon the tube may be governed by the width of the fabric strip. In turn, the rollers 25 and 26 will then be controlled to rotate the tube for the same number of revolutions. Accordingly, in applying a fabric strip which is in width five times the circumferential distance around the tube, the tube itself is rotated five revolutions; however, due to the length of the tubing beyond the length being wrapped and its coextensive disposition in relation to the tube portion being wrapped, very little twist is actually applied to the tube and mandrel at any one given point.

Figure 4:
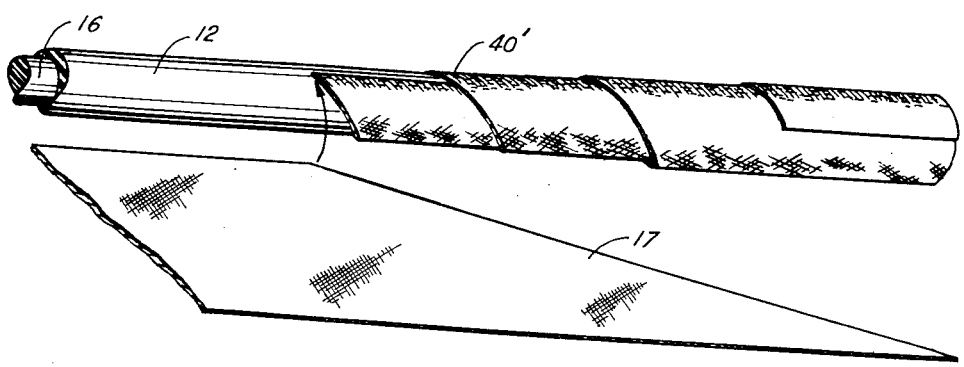
Figure 4 is a detailed view of the spirally formed end of the reinforcing layer prior to application of the next successive fabric strip.

The 50 foot length of tubing, together with the reinforcing layer, or carcass, may then be axially advanced, again along the bottom pressure rolls, by means of the pull roll, and as soon as the 50 foot length has cleared the table, another 50 foot length of the tube 12 will be in position for the next successive wrapping operation. A 50 foot strip of fabric is also led onto the table from a suitable guide-in reel and the trailing end 40, preferably, cut at a 45° angle, to the length of the strip, for application to the tube. Of course the leading end will be at a 45° angle or in general at a complementary angle to the angle formed at the trailing end of the preceding strip as a result of the previous cutting operation. At this point, care must taken to align the leading end of the fabric in position on the tube so that the leading end will be in abutting relation with the edge of the spirally formed end of the first 50 foot length, as shown in Figures 2 and 4. In Figure 4, however, the relative disposition of the fabric strips is shown as they would be on a work surface wherein the tube is being moved from left to right, instead of right to left as shown in Figure 2. Thus, the wrapped end as indicated at 40' in Figure 4 corresponds with the trailing end 40 in Figure 2.

In the next wrapping operation the fabric strip is wound upon the tube so that it will follow the convolutions in the spiral end of the first reinforcing layer, and thereby form a reinforcing layer of uniform thickness and strength at the point of splicing.

In the above described manner, each successive length of the tube is reinforced with the fabric strips, or carcass, so as to form a continuous length of reinforced tubing, such as in the order of 1,000 foot lengths. The cover may then be applied in a conventional manner, such as by extrusion onto the reinforced tube, and the assembled uncured hose is in readiness for the curing operation. At this stage, it is preferable and advantageous to utilize a lead press curing operation, especially since the tubing is in a continuous length, following which the tube may be cut to the desired lengths and the mandrel blown out in a well-known manner. The hose is then in its finished form, as shown in Figure 5.

The process of the present invention is especially adaptable for the production of wrapped hose in smaller sizes, up to 1 inch, and it will be evident that as the diameter of the hose is increased, so also is the diameter of the mandrel, and at the greater sizes of hose, the formation of the mandrel will necessarily become more critical. Therefore, although a solid mandrel formed of plastic or rubber-like material may be easily utilized for smaller sizes, the mandrel should be increased in flexibility for production of larger sized hose.

It will be apparent from the foregoing that reinforced hose, made in accordance with the present method, is essentially of the type which is composed substantially entirely of rubber-like material having a wrapped reinforcement layer in the desired number of plies, and that various forms and types of fabric material may be suitably employed. Moreover, since the hose is to be produced in continuous lengths on a mandrel, the inner and outer surfaces of the hose are perfectly smooth, offer little or no resistance to flow and provide extremely close tolerances in dimension. Also, due to the form of splicing the fabric reinforcing layer on the tube at each successive length, the reinforcing layer will, nevertheless, be of a uniform thickness and strength throughout the length of the hose, and in this form may be supplied in its finished form without the necessity of cutting the hose into separate lengths.

It will thus be evident that the hose of the present invention has especial application where long lengths of hose having a high degree of strength and flexibility are required, and where smooth outer and inner surfaces are desirable.

In accordance with the foregoing, while there has been shown and described a preferred embodiment of a hose article and process for producing the same, it will be understood that various changes in the details of forming and constructing the hose may be utilized within the spirit of the present invention as defined by the appended claims.

What is claimed is:

1. A wrapped reinforced hose comprising an inner tube and a covering including successive lengths of fabric disposed in end-to-end contacting relation with each length of said fabric being of a width to encircle said tube at least once, and the edge contacting ends of the lengths of fabric engaging each other at an angle of less than 90° to the longitudinal axis of the hose to maintain a uniform thickness of fabric throughout the length of said hose.

2. A wrapped reinforced hose comprising an inner tube of elastomeric composition, and a covering including successive lengths of fabric disposed in end-to-end contacting relation with each length of said fabric being of a width to encircle said tube at least once, the longitudinal edge of each length of said fabric extending parallel to the longitudinal axis of said tube and the edge contacting ends of the lengths of fabric engaging each other at an angle of less than 90° to the longitudinal axis of the hose to maintain a uniform thickness of fabric throughout the length of said hose.

3. A wrapped reinforced hose comprising an inner continuous length of a tube of elastomeric composition, a reinforcing layer consisting of successive lengths of fabric disposed in end-to-end contacting relation with each length of said fabric being of a width to encircle said tube to form a plurality of plies, the longitudinal edges of each length of said fabric extending parallel to the longitudinal axis of said tube and the edge contacting ends of the lengths of fabric being disposed at 45° angles to the longitudinal axis of the hose to maintain a uniform thickness of fabric throughout the length of said hose.

4. In a method of making a continuous length of hose, the steps comprising successively advancing selective lengths of a tube, bringing at least the longitudinal edge of a fabric sheet into contact with each length of the tube, rotating each length of the tube and associated fabric strip in one direction sufficient to wrap the fabric strip around the tube, then reversing the direction of rotation to untwist the tube, and followed by successively wrapping each length of the tube with the fabric strips applied in end contacting relation to one another throughout the width thereof.

5. In a method according to claim 4 characterized by severing the contacting ends at a common 45° angle.

6. In a method of making a continuous length of hose, the steps comprising successively advancing selective lengths of a tube supported on a flexible mandrel, bringing at least the longitudinal edge of a fabric sheet into contact with each length of the tube, rotating each length of the tube and associated fabric strip in one direction sufficient to wrap the fabric strip around the tube, then reversing the direction of rotation to untwist the tube and mandrel, and followed by successively wrapping each length of the tube with a corresponding length of fabric.

References Cited in the file of this patent

UNITED STATES PATENTS

| | | |
|---|---|---|
| 2,225,026 | Welsh | Dec. 17, 1940 |
| 2,267,530 | Maclachlan | Dec. 23, 1941 |
| 2,637,674 | Stahl | May 5, 1953 |
| 2,726,185 | Howald | Dec. 6, 1955 |
| 2,809,144 | Grimes | Oct. 8, 1957 |